United States Patent [19]

Campbell

[11] Patent Number: 4,799,299

[45] Date of Patent: Jan. 24, 1989

[54] CLIP TRACK DEVICE FOR SECURING FLEXIBLE SHEETS

[76] Inventor: Ken L. Campbell, 11536 Humber Dr., Mira Loma, Calif. 91752

[21] Appl. No.: 138,709

[22] Filed: Dec. 28, 1987

[51] Int. Cl.[4] .................... A44B 21/00; A47H 13/00
[52] U.S. Cl. .............................. 24/462; 24/460; 160/392; 160/395
[58] Field of Search ............ 24/460, 461, 462, 265 C; 403/381; 160/383, 392, 395, 396, 393

[56] References Cited

U.S. PATENT DOCUMENTS

| | | | |
|---|---|---|---|
| 1,049,485 | 1/1913 | Hoyt | 160/392 |
| 1,068,498 | 7/1913 | Harding | 160/395 |
| 1,424,209 | 8/1922 | Pabst | 24/460 |
| 3,757,479 | 9/1973 | Martinez | 24/462 |
| 3,805,873 | 4/1974 | Bloomfield | 160/395 |
| 3,928,897 | 12/1975 | Tombu | 24/462 |
| 3,982,306 | 9/1976 | Curry | 24/462 |
| 4,233,790 | 11/1980 | Meadows | 160/395 |
| 4,316,308 | 2/1982 | Chatelain | 160/392 |
| 4,504,027 | 3/1985 | Okamura et al. | 24/460 |
| 4,534,145 | 8/1985 | Yang et al. | 160/395 |
| 4,638,532 | 1/1987 | Yang et al. | 24/462 |
| 4,662,038 | 5/1987 | Walker | 24/460 |
| 4,694,543 | 9/1987 | Conley | 24/461 |

FOREIGN PATENT DOCUMENTS

| | | | |
|---|---|---|---|
| 77125 | 12/1961 | France | 24/462 |
| 1467374 | 1/1967 | France | 160/395 |

Primary Examiner—Victor N. Sakran
Attorney, Agent, or Firm—Francis X. LoJacono

[57] ABSTRACT

An improved track and spline or clip member defining a mechanical fastening system for attaching sheet or cover material to the track in a positive manner, wherein the track includes a channel having an improved configuration comprising a base member with a central V-shaped bottom wall surface fluted at the outer edges thereof, inclined inner side wall surfaces, a dual durometer plastic insert clip or spline having a central semi-rigid body member, and integrally formed outer rigid wing members arranged to be inserted in the channel for locking engagement therein with the sheet material being interposed between the track cahnnel and the spline.

6 Claims, 2 Drawing Sheets

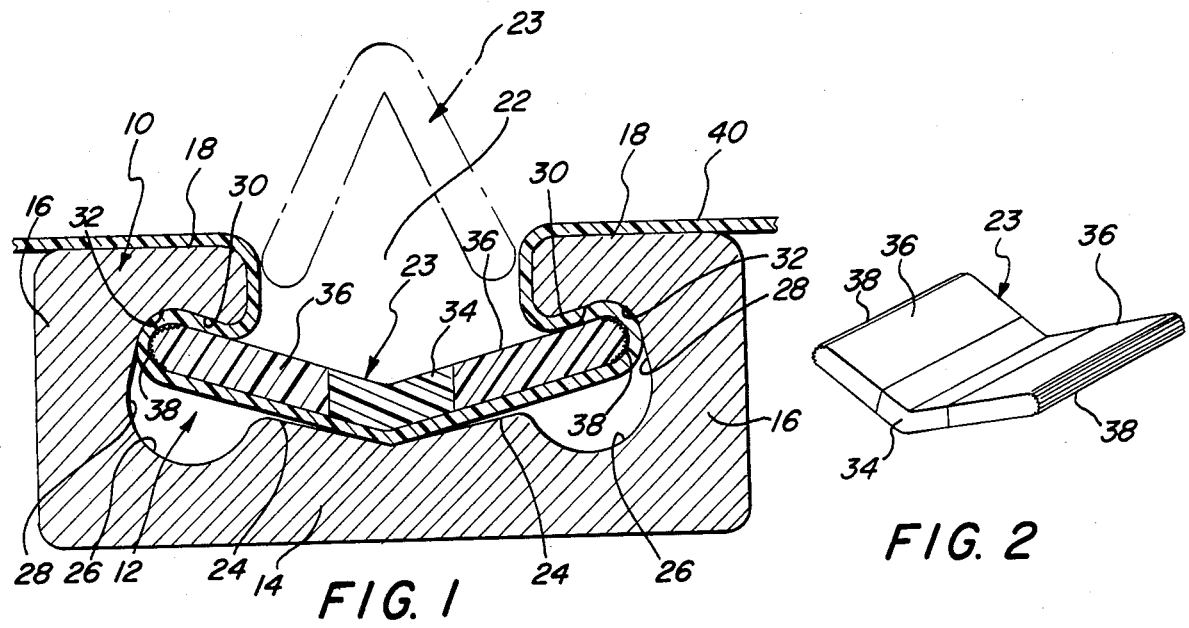
FIG. 1
FIG. 2
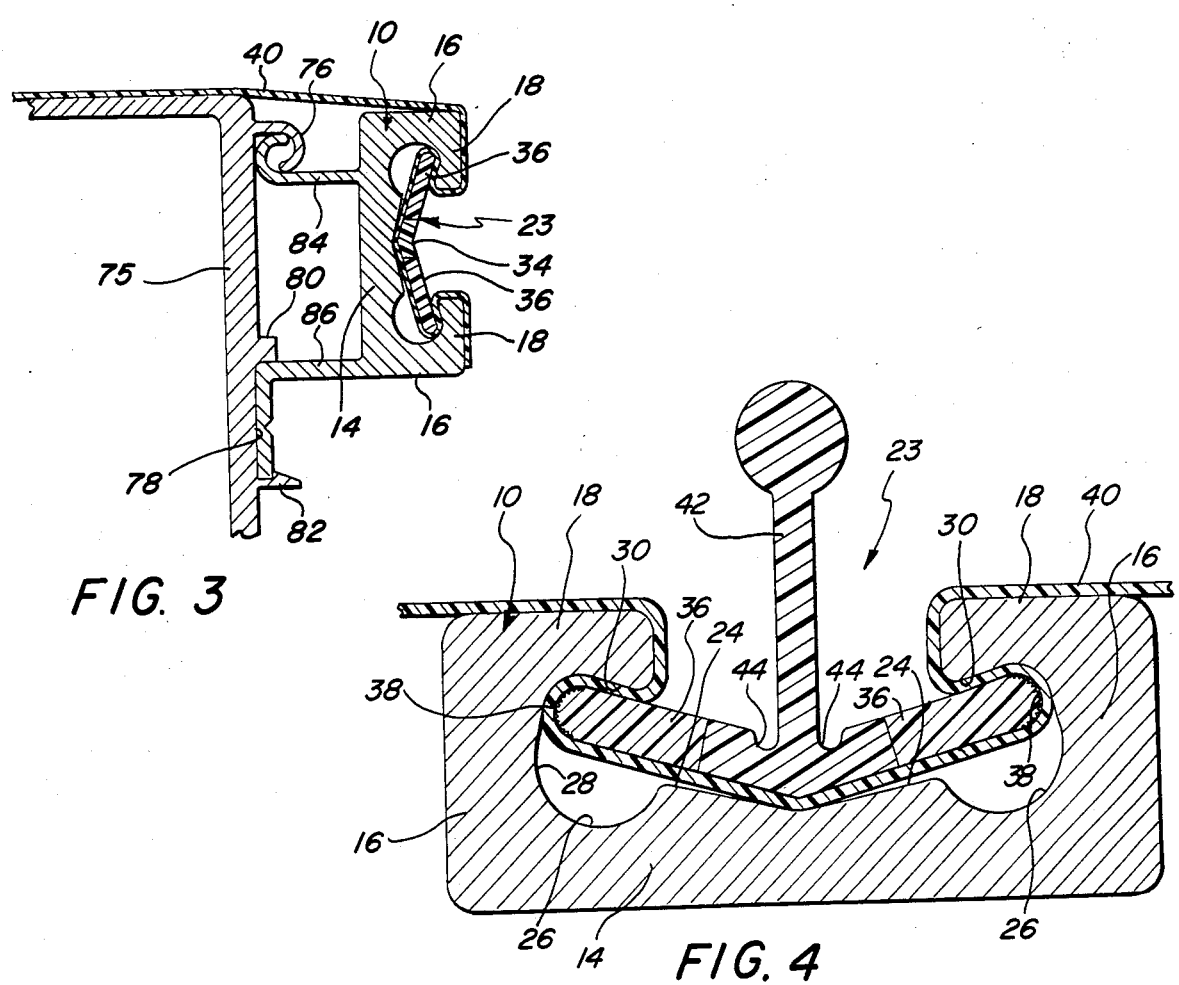
FIG. 3
FIG. 4

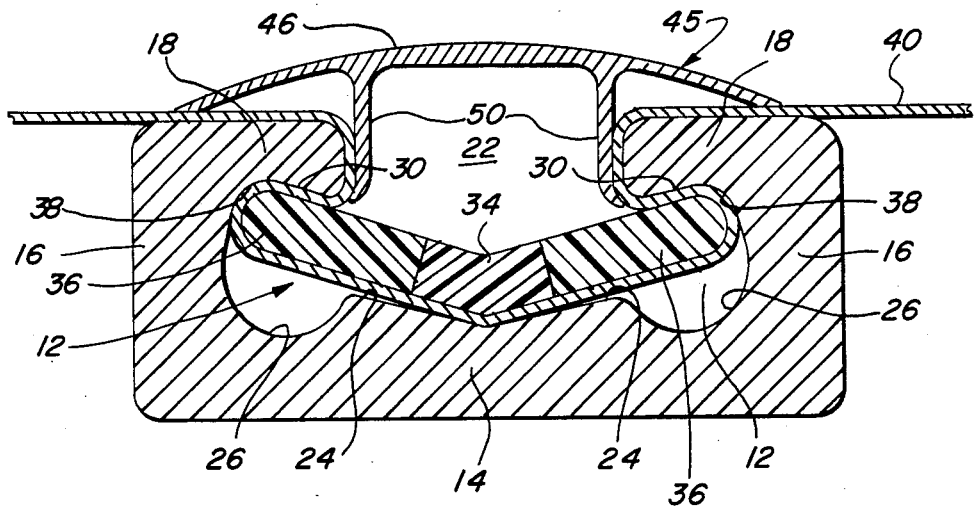
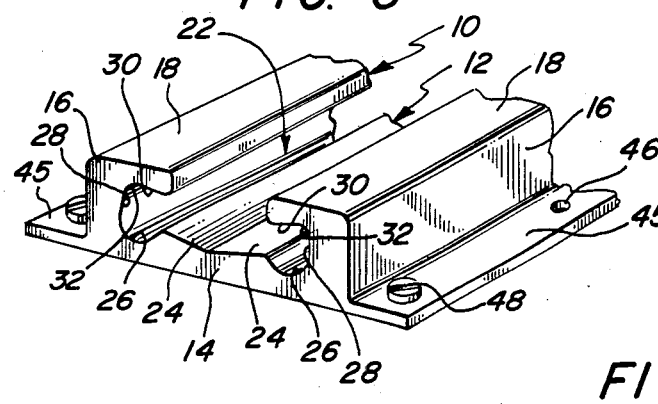
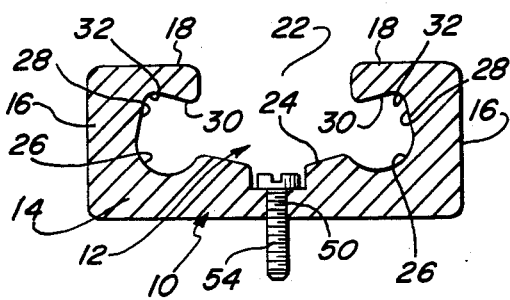
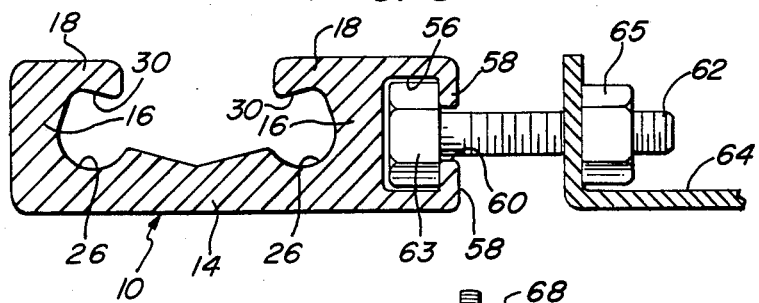
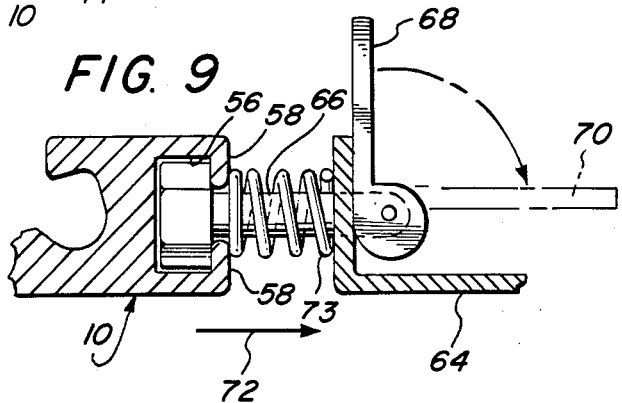

CLIP TRACK DEVICE FOR SECURING FLEXIBLE SHEETS

BACKGROUND OF THE INVENTION

Field of the Invention

This invention relates generally to mechanical fastening systems for attaching flexible sheets to track members, and more particularly to an improved clip track and clip member wherein the channel of the track is formed having an improved configuration including a base member with an angled bottom wall having fluted outer edges, angled side walls, and a durometer plastic insert or clip having rigid and semi-rigid sections.

Description of the Prior Art

It is well known in the art that various problems and difficulties are encountered in providing suitable means for securing and retaining a flexible sheet material or membrane to a substrate or support without either press-fitting or puncturing the sheet or membrane. For simplicity, the word "sheet" will be employed hereinafter to represent all types of sheets and membranes as known and used in the art such as, for example, cloth, canvas and plastic sheet materials.

With respect to specific prior art applications of mechanical fastening systems, one may refer to the following U.S. patents:

There is disclosed in U.S. Pat. No. 3,757,479 to Martinez a mirror comprising a frame with an external continuous groove having opposed side undercuts. A flexible strip presses a flexible reflective sheet into the grooves to hold the sheet in a fixed stretched condition on the frame of a smooth mirror surface. The flexible strip has an inverted V-shape with wings that can be pressed down and toward each other to enable the strip to enter the groove, wherein the groove is framed having an identical V-shaped cross-sectional configuration as the strip.

U.S. Pat. No. 3,805,873 to Bloomfield discloses a fastener for flexible covers utilizing a channel for receiving a locking member and for holding the cover in the channel when the flexible cover is under tension, the locking member being defined by a relatively flat bar. The internal configuration of the channel does not allow for extreme tensioning of the attached sheet or cover.

In U.S. Pat. No. 3,987,835 to Bloomfield there is disclosed a double-cord edge fastener for attaching canvas tarpaulin to structures. This device comprises a channel member fixed to a structure to be covered, and is used in cooperation with lock members having a pair of bead portions attached to the cover being used therewith.

There is disclosed in U.S. Pat. No. 4,107,826 to Tysdal a flexible covering anchor defined by a two-piece assembly that provides for attaching sheet material. The anchor comprises an elongated base member secured to a support and includes a channel longitudinally therealong for receiving a portion of the sheet material therein. A holding element is attached to the channel and is formed having a substantially S-shaped configuration so as to be positioned in and over the channel.

In U.S. Pat. No. 4,534,145 to Yang there is disclosed an attachment device for securing flexible sheets within a channel member via an insert member of a generally inverted V-shape, wherein the latter is made of a ductile but rigid material having a central longitudinal portion of reduced rigidity that serves to define two adjacent wing portions and permits the subsequent plastic deformation of the insert member into its installed shape after its insertion into the channel member.

There is further disclosed in U.S. Pat. No. 4,638,532 to Yang a mechanical fastening system for securing a flexible sheet within a channel member via an insert member, wherein the latter is made of flexible resilient material having a central longitudinal flex notch that serves to define two adjacent wing portions and permits a temporary elastic deformation of the insert member into an inverted V-shape for insertion of the insert member, together with the flexible sheet, into the channel member.

SUMMARY OF THE INVENTION

The present invention is an improvement over the art with respect to providing a unique cross-sectional configuration of the channel formed in a substantially rigid track member, and providing in conjunction therewith a compatible insert spline or clip formed by rigid and semi-rigid sections, so as to establish a more positive locking interaction between the track and insert as the sheet material is interposed therebetween. The longitudinal channel within the track is defined by a base member and oppositely disposed side walls, the base member being provided with a centrally disposed, inner V-shaped surface wall having marginal edges fluted to define oppositely disposed, rounded and recessed grooves. The inner surfaces of the side walls are angled inwardly and upwardly to establish a self-locking means for the inserted spline and further to provide the means for positive securing of the interposed sheet material.

The upper portion of the track includes inwardly extending rails, the underside of each rail having an inclined surface arranged to promote loading against the inserted spline in a parallel relation with each other. The insert spline is arranged having two integrally formed members, the winged members being formed as rigid members intercoupled by a semi-rigid central member, allowing flexibility of the wing member for ease of inserting into the track channel.

Accordingly, it is an important object of the present invention to provide a unique track and insert clip or spline that allows various types of sheet materials to be positively locked within the channel of the track.

Another object of the invention is to provide an improved clip track device that defines a self-tightening retaining system that further allows for ease of clip insertion and removal, and permanent non-slip tensioning without the use of screws or other extra devices.

A further object of the present invention is to provide an improved device of this type that allows easy removal and/or replacement of materials without damaging material previously fastened.

Still another object of the present invention is to provide a device of this character that has a unique arrangement whereby at least thirty different applications are now possible including those in the arts of flexible sign faces, awnings, room partitions, window weather protection, tents, truck-bed covers, roof equipment, screens, kites, hang gliders, pool covers, etc.

Still another object of the invention is to provide a fastening system of this character that allows for several arrangements for fastening the track to a structure member, either as a fixed track or an adjustable track, as indicated hereinafter.

The various features of novelty which characterize the invention are pointed out with particularity in the claims annexed to and forming a part of this disclosure. For a better understanding of the invention, its operating advantages by its use, reference should be had to the accompanying drawings and descriptive matter in which there are illustrated and described the preferred embodiments of the invention.

BRIEF DESCRIPTION OF THE DRAWINGS

Referring more particularly to the accompanying drawings, which are presented for illustrative purposes only:

FIG. 1 is an enlarged cross-sectional view of the track and insert spline of the present invention with a sheet of material interposed therebetween and secured in a positive manner within the track channel;

FIG. 2 is a perspective view of a clip-type spline;

FIG. 3 is a cross-sectional view of the present invention wherein the track is formed with means for attaching the track to a fixed structure;

FIG. 4 is an enlarged cross-sectional view of the present invention illustrating an alternative arrangement of the spline locking member;

FIG. 5 is a cross-sectional view similar to that shown in FIG. 1 including a channel plate attached thereto;

FIG. 6 is a perspective of a portion of a track member that is arranged to be secured by screws received in outer flange members;

FIG. 7 is a cross-sectional view of the track showing an alternative securing arrangement;

FIG. 8 is a cross-sectional view of the track member shown in another alternative securing mode of operation; and FIG. 9 is another view illustrating a further mounting arrangement of the track member thereof.

DESCRIPTION OF THE PREFERRED EMBODIMENT

Referring more particularly to the basic form of the present invention, there is shown in FIG. 1 a cross-section of a track member, generally indicated at 10, in which is formed a longitudinal channel 12 defined by a base member 14 and side walls or members 16, each oppositely disposed wall member being additionally provided with inwardly projecting rail members 18 arranged to define an elongated slot or opening 22 through which a clip or locking spline, generally designated at 23, is adapted to be inserted so as to be received in locking channel 12.

In order to establish the unique positive locking arrangement between track 10 and spline 23, channel 12 has specially formed inner wall surfaces, whereas base member 14 is formed having a pair of inclined central wall surfaces 24, thus establishing the arrangement of a moderately V-shaped surface. The marginal edges of the V-shaped inner base surface 24 are fluted at 26 so as to provide oppositely disposed rounded and recessed grooves which run longitudinally within channel 12, as better seen in FIG. 6.

Side walls 16 are each formed having an upwardly and inwardly arranged inner wall surface 28. These inclined surfaces 28 provide a locking means for engagement with members forming spline 23, as will be described later herein. Thus, the inner inclined side wall surfaces intersect the under inner wall surface 30 of each respective rail member 18. Surfaces 30 are inclined inwardly and downwardly from channel 12. The intersection of the respective wall surfaces 28 and 30 is defined by curved groove 32. The cooperating inner wall surfaces 24, 26, 28, 30 and 32 can be clearly viewed in FIG. 6.

Referring now to FIGS. 1 and 2, there is illustrated therein a locking means, hereinbefore referred to as a clip or locking spline 23 which is formed as a dual durometer plastic device having a central body portion 34 which extends the length of the spline, and is integrally formed as a single unit with wing members 36 defining the marginal edges thereof. Center portion 34 is formed from a semi-rigid plastic material having a V-shaped configuration with an angular displacement similar to that of the inner wall surfaces 24 of base member 14. Thus, the outwardly extending wing members 36 are inclined upwardly and outwardly so as to be in parallel relation with the under wall surfaces of the rail members 18, as seen in FIGS. 1, 3 and 5. The outer free edges of each oppositely positioned wing member are formed having a plurality of longitudinal serrations 38 at the outer radius so as to provide a positive grip to a wide variety of materials, such as designated at 40. As previously mentioned, said material may vary depending upon the need and application thereof.

Accordingly, when mounting a sheet material 40 it is positioned over opening 22 so as to be fitted into channel 12, the locking spline 23 being bent into a reverse V-shape, as seen in FIG. 1, and forced downwardly against sheet 40 until the sheet and spline are positioned in channel 12. Wings 36 of the spline will readily spread apart as they extend below each upper rail member 18. This spreading is aided by fluted grooves 26 which allow the spline to return to its natural V-shaped configuration. The fluted grooves 26 enable insertion of the spline and extension to its maximum width. Thus, the unique flexibility of the locking spline is due to the semirigid central portion 34. It is important to further note that inclined side wall surfaces 28 provide a positive securing means for the various materials 40, since different thicknesses of materials may be employed. The angled surface will compensate for the particular thickness of a given material. Thus, the angular arrangement of side wall surfaces 28 provides a positive locking feature by limiting the distance point-to-point at the extreme outer serrated edges of the spline. Hence, this arrangement aids in the retention of multiple thicknesses and/or layers of materials in the same track. It should also be noted that the under surfaces 30 and wing members 36 are designed to create loading against insert spline 23 that would be parallel to the rigid wing members 36, thus preventing bending or flexing of said spline 23.

Referring to FIG. 4, there is shown an alternative arrangement of spline 23 which includes a vertical tab member 42 integrally formed as part of the central semi-rigid central body 34 of the spline. This allows the splines of this design to be readily removed and replaced as necessary. However, in order to provide for the inverted bending of wing members 36, a pair of oppositely disposed grooves 44 are formed at the base of tab 42.

FIG. 5 is an identical arrangement to that shown and described in FIG. 1, but further includes a channel cap 45 having an outer arcuate wall 46 provided with a sufficient width to extend well over opening 22. Depending from arcuate wall 46 are a pair of flexible tongue members 50 snapped between rails 18 and wedged against sheet material 40. This prevents water, dirt or other unwanted matter from collecting within opening 22.

FIGS. 3, and 6 through 9 illustrate various types of track-mounting means which are disclosed.

In FIG. 6 track 10 has side extending flanges 45 which are formed as integral parts of base member 14 and are provided with a plurality of holes 46 so as to receive suitable fasteners, as indicated by screws 48.

In FIG. 7 track 10 has centrally positioned holes 50 with enlarged countersinks 52 to receive the heads of screws 54.

The track-mounting means indicated in FIG. 8 comprises a side channel 56 formed along one of said side walls and includes flange members 58 that define a longitudinal slot 60. This arrangement allows channel 56 to receive and support a bolt 62 wherein the head 63 thereof is mounted in channel 56. Bolt 62 extends outwardly so as to be attached to a fixed structure, such as at 64, by a nut 65.

The arrangement of FIG. 9 is similar to that shown in FIG. 8. That is, track 10 includes side channel 56 and flange members 58. However, instead of a bolt, a headed stud 66 is mounted in channel 56. Stud 66 extends outwardly and is movably attached to fixed structure 64 shown as an angle iron. The opposite end of stud 66 is provided with a cam latch 68. When cam latch 68 is moved to a down or closed position, as shown at 70, track 10 is pulled in the direction of arrow 72 against spring 73, thereby placing tension on any material attached to the track. Such an arrangement defines a tensioning means.

Referring back to FIG. 3, track 10 is shown as being removably attached to a support structure 75. The track and the support structure are coupled together by a coupling means whereby structure 75 is provided with a longitudinally formed hook member 76 and a support channel 78 defined by rib member 80 and snap flange 82. Accordingly, track 10 is formed having an extended hook member 84 adapted to be coupled with the corresponding hook member 76 of structure 75. Positioned below and parallel to hook member 84 there is provided a longitudinally arranged leg member 86 having a substantially L-shaped configuration that is arranged to snap into support channel 78 held therein by snap flange 82.

The foregoing is a description of the preferred embodiments of the invention which is given here by way of example only. The invention is not to be taken as limited to any of the specific features as described, but comprehends all such variations thereof as come within the scope of the appended claims.

I claim:

1. In combination, an improved track device and spline member used as a fastener system for securing flexible cover or sheet materials, wherein the combination comprises:
    an elongated track having a base member, a pair of oppositely disposed side-wall members, and inwardly projecting rail members;
    a channel defined by said base member, said side-wall members, and said rail members;
    said base member being formed with a pair of inclined, inner-wall surfaces centrally positioned in said channel and having a V-shaped configuration, the outer marginal edges thereof being fluted to define oppositely positioned, recessed, longitudinal grooves;
    said side-wall members being formed with inner, tapered wall surfaces, each inclined inwardly and upwardly of said channel;
    said rail members being formed with inner, tapered wall surfaces that are inclined inwardly and downwardly of said channel;
    a spline member having a central body member of semi-rigid material; and
    a pair of wing members formed from a substantially rigid material and integrally formed with said central body member, whereby said wing members are readily repositioned to be inserted in said channel so as to lockingly engage the flexible sheet material interposed between said track and said spline.

2. The combination as recited in claim 1, wherein each wing member is formed with outer free edges including longitudinal serrations formed therein.

3. The combination as recited in claim 2, including means for mounting said track to a fixed structure.

4. The combination as recited in claim 3, wherein said mounting means comprises a pair of flange members extending outwardly from said side-wall members.

5. The combination as recited in claim 3, wherein said track includes an outer side channel to receive a securing means, whereby said track is secured to a fixed structure.

6. The combination as recited in claim 3, wherein said mounting means comprises a coupling means formed between said track and a fixed structure.

* * * * *